(12) United States Patent
Ito

(10) Patent No.: US 11,101,488 B2
(45) Date of Patent: Aug. 24, 2021

(54) FUEL CELL SYSTEM

(71) Applicant: TOYOTA JIDOSHA KABUSHIKI KAISHA, Toyota-shi (JP)

(72) Inventor: Masayuki Ito, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 78 days.

(21) Appl. No.: 16/592,332

(22) Filed: Oct. 3, 2019

(65) Prior Publication Data
US 2020/0144652 A1   May 7, 2020

(30) Foreign Application Priority Data

Nov. 5, 2018 (JP) .............................. JP2018-208070

(51) Int. Cl.
| | |
|---|---|
| *H01M 8/249* | (2016.01) |
| *H01M 8/0432* | (2016.01) |
| *H01M 8/0438* | (2016.01) |
| *H01M 8/04089* | (2016.01) |
| *H01M 8/04858* | (2016.01) |
| *H01M 8/04746* | (2016.01) |

(52) U.S. Cl.
CPC ......... *H01M 8/249* (2013.01); *H01M 8/0435* (2013.01); *H01M 8/0488* (2013.01); *H01M 8/04089* (2013.01); *H01M 8/04395* (2013.01); *H01M 8/04343* (2013.01); *H01M 8/04388* (2013.01); *H01M 8/04753* (2013.01)

(58) Field of Classification Search
CPC ............... H01M 8/249; H01M 8/0435; H01M 8/04395; H01M 8/0488
See application file for complete search history.

(56) References Cited

U.S. PATENT DOCUMENTS

| | | | | |
|---|---|---|---|---|
| 2011/0003221 | A1* | 1/2011 | Mizuno ............... | H01M 8/0488 429/429 |
| 2017/0358809 | A1* | 12/2017 | Saito ................. | H01M 8/04201 |

FOREIGN PATENT DOCUMENTS

| | | |
|---|---|---|
| JP | 2009-059610 | 3/2009 |
| JP | 20009-059610 | 3/2009 |
| JP | 2017-162674 | 9/2017 |

\* cited by examiner

*Primary Examiner* — Olatunji A Godo
(74) *Attorney, Agent, or Firm* — Finnegan, Henderson, Farabow, Garrett & Dunner, LLP

(57) ABSTRACT

A fuel cell system includes a plurality of fuel cell stacks, a power generation control unit that controls power generation of the plurality of fuel cell stacks based on a required power for the plurality of fuel cell stacks, and a refreshing control unit configured to perform a refreshing process of decreasing a voltage on the plurality of fuel cell stacks. The refreshing control unit performs the refreshing process on the first fuel cell stack when the required power changes from a state in which the required power is less than a first predetermined value to a state in which the required power is equal to or greater than the first predetermined value and when the required power is in a range which is equal to or greater than the first predetermined value and less than the second threshold value.

9 Claims, 9 Drawing Sheets

FUEL CELL SYSTEM

INCORPORATION BY REFERENCE

The disclosure of Japanese Patent Application No. 2018-208070 filed on Nov. 5, 2018 including the specification, drawings and abstract is incorporated herein by reference in its entirety.

BACKGROUND

1. Technical Field

The disclosure relates to a fuel cell system.

2. Description of Related Art

In a fuel cell including a membrane-electrode assembly in which electrodes are disposed on both surfaces of an electrolyte membrane, it is known that a refreshing process of temporarily decreasing a voltage of the fuel cell may be performed to remove an oxide layer formed on a surface of a catalyst included in the electrodes and impurities attached thereto. For example, in a fuel cell system including a plurality of fuel cell stacks, it is known that a refreshing process may be sequentially performed on the plurality of fuel cell stacks when the fuel cell system is started or stopped (for example, see Japanese Unexamined Patent Application Publication No. 2009-59610 (JP 2009-59610 A)).

SUMMARY

When a voltage of a fuel cell stack reaches a high potential after the oxide layer and the impurities on the catalyst surface have been removed through the refreshing process, the catalyst is likely to elute, an amount of catalyst decreases gradually due to the elution, and thus degradation of power generation performance is caused. When the fuel cell stack does not generate electric power for a long time after the oxide layer and the impurities on the catalyst surface have been removed through the refreshing process, an oxide layer is formed on the catalyst surface and/or impurities become attached to the catalyst surface again and thus degradation of power generation performance is caused in the long term.

The disclosure enables performance of a refreshing process at an appropriate time.

According to an aspect of the disclosure, there is provided a fuel cell system including: a plurality of fuel cell stacks including a first fuel cell stack and a second fuel cell stack; a power generation control unit configured to control power generation of the plurality of fuel cell stacks based on a required power for the plurality of fuel cell stacks; and a refreshing control unit configured to perform a refreshing process of decreasing a voltage on the plurality of fuel cell stacks. The power generation control unit is configured to stop power generation of the first fuel cell stack when the required power is equal to or greater than a first threshold value and less than a second threshold value which is greater than the first threshold value and to allow the first fuel cell stack to generate electric power when the required power is equal to or greater than the second threshold value. The refreshing control unit is configured to perform the refreshing process on the first fuel cell stack when the required power changes from a state in which the required power is less than a first predetermined value which is greater than the first threshold value and less than the second threshold value to a state in which the required power is equal to or greater than the first predetermined value and when the required power is in a range which is equal to or greater than the first predetermined value and less than the second threshold value.

The refreshing control unit may be configured to determine whether the refreshing process is to be performed on the first fuel cell stack and to perform the refreshing process on the first fuel cell stack when it is determined that the refreshing process is to be performed.

The fuel cell system may further include a plurality of switches that are connected between the plurality of fuel cell stacks and an auxiliary machine into which a current supplied from the plurality of fuel cell stacks flows. The power generation control unit may be configured to set a switch that is connected between the first fuel cell stack and the auxiliary machine out of the plurality of switches to a disconnected state when power generation of the first fuel cell stack is stopped. The refreshing control unit may be configured to change a state of the switch from the disconnected state to a connected state when the refreshing process is to be performed on the first fuel cell stack.

The refreshing control unit may be configured to perform the refreshing process by sweeping the first fuel cell stack with a current without supplying a cathode gas thereto.

The first predetermined value may be a central value between the first threshold value and the second threshold value.

The first threshold value may be 0.

The power generation control unit may be configured to stop power generation of the second fuel cell stack when the required power is equal to or greater than a third threshold value which is equal to or greater than the second threshold value and is less than a fourth threshold value which is greater than the third threshold value and to allow the second fuel cell stack to generate electric power when the required power is equal to or greater than the fourth threshold value and when the required power is less than the third threshold value. The refreshing control unit may be configured to perform the refreshing process on the second fuel cell stack when the required power changes from a state in which the required power is less than a second predetermined value which is greater than the third threshold value and less than the fourth threshold value to a state in which the required power is equal to or greater than the second predetermined value and when the required power is in a range which is equal to or greater than the second predetermined value and less than the fourth threshold value.

The power generation control unit may be configured to stop power generation of the second fuel cell stack when the required power is equal to or greater than a third threshold value which is equal to or greater than the second threshold value and is less than a fourth threshold value which is greater than the third threshold value and to allow the second fuel cell stack to generate electric power when the required power is equal to or greater than the fourth threshold value and when the required power is less than the third threshold value. The refreshing control unit may be configured to perform the refreshing process on the second fuel cell stack when the required power changes from a state in which the required power is greater than a third predetermined value which is greater than the third threshold value and less than the fourth threshold value to a state in which the required power is equal to or less than the third predetermined value and when the required power is in a range which is equal to or greater than the third threshold value and equal to or less than the third predetermined value.

A maximum output power of the first fuel cell stack may be greater than that of the second fuel cell stack.

According to the disclosure, it is possible to perform a refreshing process at an appropriate time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings.

Figure 1:
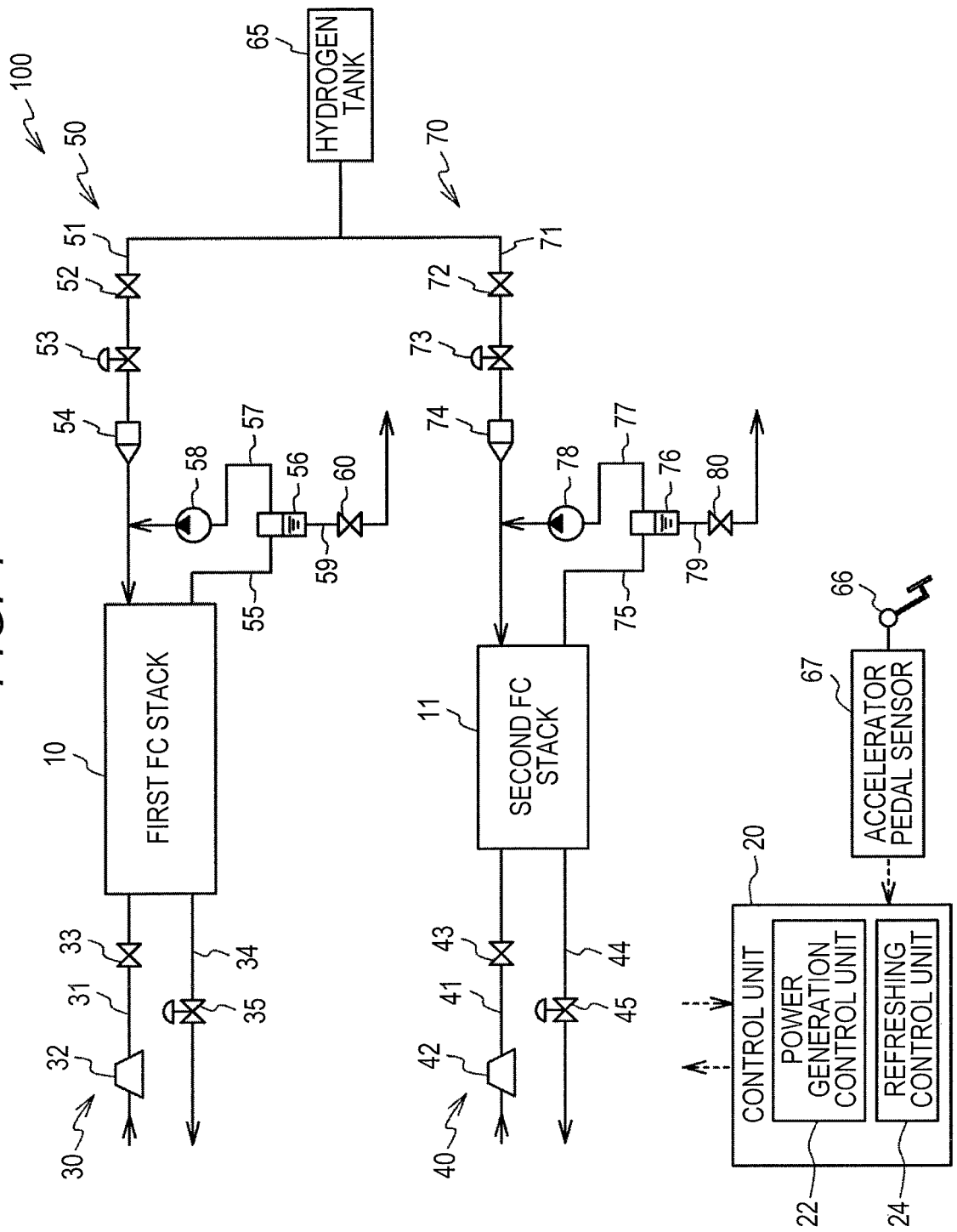
FIG. 1 is a diagram schematically illustrating a configuration of a fuel cell system according to a first embodiment.

FIG. 1 is a diagram schematically illustrating a configuration of a fuel cell system according to a first embodiment. The fuel cell system is a power generation system that is used for a fuel-cell vehicle, a stationary fuel-cell device, and the like and outputs electric power in accordance with a required power. In the following embodiment, it is assumed that the fuel cell system is mounted in a vehicle. As illustrated in FIG. 1, a fuel cell system 100 includes a first fuel cell stack 10 (hereinafter also referred to as a first FC stack 10), a second fuel cell stack 11 (hereinafter also referred to as a second FC stack 11), a control unit 20, cathode gas pipe systems 30 and 40, and anode gas pipe systems 50 and 70. The fuel cell system 100 also includes a refrigerant pipe system, which is not illustrated nor described herein.

The first FC stack 10 and the second FC stack 11 are solid polymer type fuel cells that are supplied with hydrogen (an anode gas) and air (a cathode gas) as reactant gases and generate electric power. The first FC stack 10 and the second FC stack 11 have a stacked structure in which a plurality of cells is stacked. Each cell includes a membrane-electrode assembly which is a power generator having electrodes disposed on both surfaces of an electrolyte membrane and a pair of separators between which the membrane-electrode assembly is interposed.

The electrolyte membrane is a solid polymer membrane which is formed of a fluorine-based resin material or a hydrocarbon-based resin material having a sulfonate group and exhibits excellent proton conductivity in a wet state. The electrodes include carbon carriers. The carbon carriers in the electrodes carry a catalyst (for example, platinum or platinum-cobalt alloy) for promoting a power generation reaction. A manifold for allowing reactant gases to flow is provided in each cell. Reactant gases flowing in the manifold are supplied to a power generation region of each cell via gas flow passages which are provided in each cell.

The first FC stack 10 has a greater maximum output power than the second FC stack 11. For example, the first FC stack 10 has a larger number of cells stacked than the second FC stack 11 and thus the maximum output power thereof is greater.

Figure 2:
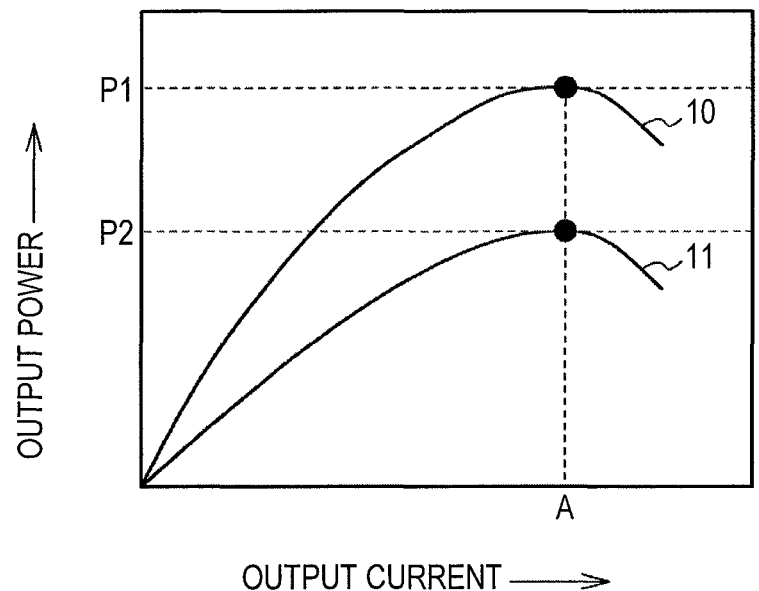
FIG. 2 is a current-power characteristic diagram illustrating a relationship between an output current and an output power of a first fuel cell stack and a second fuel cell stack.

FIG. 2 is a current-power characteristic diagram illustrating a relationship between an output current and an output power of the first FC stack and the second FC stack. As illustrated in FIG. 2, a maximum output power P1 of the first FC stack 10 is greater than a maximum output power P2 of the second FC stack 11. The first FC stack 10 and the second FC stack 11 are different in the maximum output power because they have different numbers of cells which are formed of the same material and which have the same power generation area. Accordingly, an output current at the maximum output power P1 of the first FC stack 10 and an output current at the maximum output power P2 of the second FC stack 11 are the same magnitude of (for example, the same) output current A. The first FC stack 10 has the same number of cells stacked as the second FC stack 11 but the maximum output power thereof may be greater because of different materials and/or power generation areas.

When a maximum allowable current and/or a minimum allowable voltage are set for the output current and/or the output voltage in the first FC stack 10 and the second FC stack 11 for the purpose of avoidance of a rapid voltage drop, suppression of heat emission in the FC stack, or the like, the maximum output powers of the first FC stack 10 and the second FC stack 11 may be set to maximum output powers within an allowable range.

Figure 3:
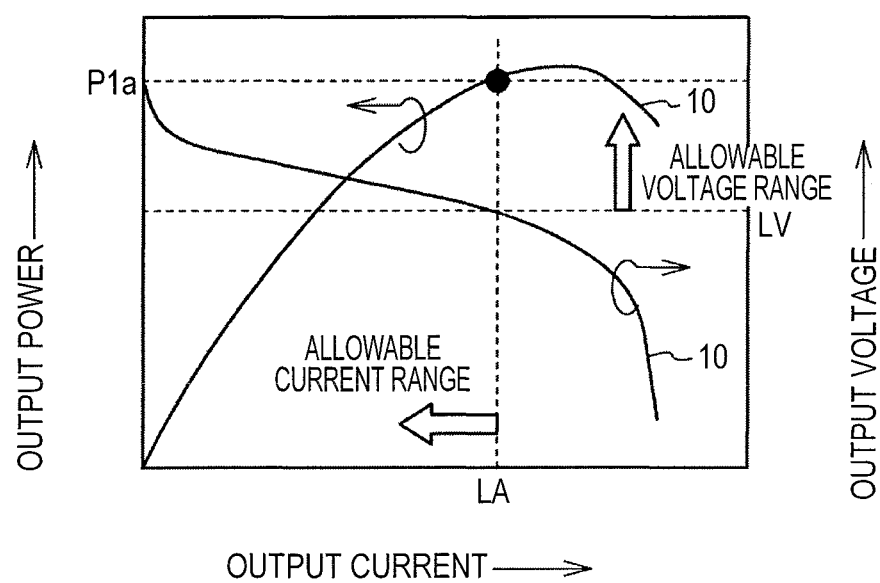
FIG. 3 is a diagram illustrating a maximum output power when a maximum allowable current and a minimum allowable voltage are set in the first fuel cell stack.

FIG. 3 is a diagram illustrating a maximum output power when a maximum allowable current and a minimum allowable voltage are set in the first FC stack. When a maximum allowable current LA and a minimum allowable voltage LV are set as illustrated in FIG. 3, a maximum power P1ain an allowable current range and an allowable voltage range may be set as the maximum output power of the first FC stack 10. The same is true of the second FC stack 11.

As illustrated in FIG. 1, the control unit 20 serves as a power generation control unit 22 and a refreshing control unit 24. An accelerator operation amount signal is transmitted to the control unit 20 from an accelerator pedal sensor 67 that detects an amount of operation of an accelerator pedal 66 (that is, an amount of depression of the accelerator pedal 66 by a driver).

The power generation control unit 22 calculates a required power based on the accelerator operation amount signal and controls the constituent units of the fuel cell system 100 which will be described later in accordance with the calculated required power such that power generation of the first FC stack 10 and the second FC stack 11 is controlled. The refreshing control unit 24 calculates a required power based on the accelerator operation amount signal and controls the constituent units of the fuel cell system 100 which will be described later in accordance with the calculated required power such that a refreshing process of temporarily decreasing a voltage is performed on the first FC stack 10 and the second FC stack 11. Here, the required power for the entire fuel cell system 100 including the first FC stack 10 and the second FC stack 11 is calculated based on the accelerator operation amount. When the fuel cell system 100 includes a secondary battery, a state of charge of the secondary battery may be detected and the required power for the first FC stack 10 and the second FC stack 11 may be calculated in consideration of electric power which is charged/discharged by the secondary battery. The refreshing control unit 24 may use the required power calculated by the power generation control unit 22 instead of calculating the required power based on the accelerator operation amount signal.

The cathode gas pipe system 30 supplies a cathode gas to the first FC stack 10 and discharges a cathode exhaust gas which has not been consumed in the first FC stack 10. The cathode gas pipe system 30 includes a cathode gas pipe 31, an air compressor 32, a switching valve 33, a cathode exhaust gas pipe 34, and a pressure regulator valve 35. The cathode gas pipe 31 is a pipe that is connected to a cathode inlet of the first FC stack 10. The air compressor 32 is connected to a cathode of the first FC stack 10 via the cathode gas pipe 31, takes outside air in, and supplies compressed air as a cathode gas to the first FC stack 10. The control unit 20 controls a flow rate of air which is supplied to the first FC stack 10 by controlling driving of the air compressor 32. The switching valve 33 is provided between the air compressor 32 and the first FC stack 10 and is opened and closed depending on a flow of air in the cathode gas pipe 31. For example, the switching valve 33 is normally closed and is opened when air with a predetermined pressure is supplied from the air compressor 32 to the cathode gas pipe 31. The cathode exhaust gas pipe 34 is a pipe that is connected to a cathode outlet of the first FC stack 10 and discharges a cathode exhaust gas to the outside of the fuel cell system 100. The pressure regulator valve 35 regulates a pressure of the cathode exhaust gas in the cathode exhaust gas pipe 34.

The cathode gas pipe system 40 supplies a cathode gas to the second FC stack 11 and discharges a cathode exhaust gas which has not been consumed in the second FC stack 11. The cathode gas pipe system 40 includes a cathode gas pipe 41, an air compressor 42, a switching valve 43, a cathode exhaust gas pipe 44, and a pressure regulator valve 45. The cathode gas pipe 41, the air compressor 42, the switching valve 43, the cathode exhaust gas pipe 44, and the pressure regulator valve 45 have the same functions as the cathode gas pipe 31, the air compressor 32, the switching valve 33, the cathode exhaust gas pipe 34, and the pressure regulator valve 35 of the cathode gas pipe system 30, respectively. Accordingly, the control unit 20 controls a flow rate of air which is supplied to the second FC stack 11 by controlling driving of the air compressor 42.

The anode gas pipe system 50 supplies an anode gas to the first FC stack 10 and discharges an anode exhaust gas which has not been consumed in the first FC stack 10. The anode gas pipe system 50 includes an anode gas pipe 51, a switching valve 52, a regulator 53, an injector 54, an anode exhaust gas pipe 55, a gas-liquid separator 56, an anode gas circulation pipe 57, a circulation pump 58, an anode drainage pipe 59, and a drainage valve 60. The anode gas pipe 51 is a pipe that connects a hydrogen tank 65 to an anode inlet of the first FC stack 10. That is, the hydrogen tank 65 is connected to the anode of the first FC stack 10 via the anode gas pipe 51 and supplies hydrogen stored in the tank to the first FC stack 10. The switching valve 52, the regulator 53, and the injector 54 are arranged in the anode gas pipe 51 in this order from upstream. The switching valve 52 is switched in accordance with a command from the control unit 20 and controls flowing of hydrogen from the hydrogen tank 65 to upstream side of the injector 54. The regulator 53 is a decompression valve that regulates a pressure of hydrogen upstream from the injector 54. The injector 54 is an electromagnetically driven switching valve of which a valve body is electromagnetically driven based on a drive cycle and a valve opening time which are set by the control unit 20. The control unit 20 controls a flow rate of hydrogen which is supplied to the first FC stack 10 by controlling the drive cycle and/or the valve opening time of the injector 54.

The anode exhaust gas pipe 55 is a pipe that connects an anode outlet of the first FC stack 10 to the gas-liquid separator 56 and guides an anode exhaust gas including unreacted gas (such as hydrogen and nitrogen) which has not been used for a power generation reaction to the gas-liquid separator 56. The gas-liquid separator 56 separates the anode exhaust gas into a gas component and moisture, guides the gas component to the anode gas circulation pipe 57, and guides the moisture to the anode drainage pipe 59. The anode gas circulation pipe 57 is connected to the anode gas pipe 51 downstream from the injector 54. The circulation pump 58 is provided in the anode gas circulation pipe 57. Hydrogen included in the gas component separated by the gas-liquid separator 56 is supplied to the anode gas pipe 51 by the circulation pump 58. The circulation pump 58 operates in accordance with a command from the control unit 20. The anode drainage pipe 59 is a pipe that discharges the moisture separated by the gas-liquid separator 56 to the outside of the fuel cell system 100. The drainage valve 60 is provided in the anode drainage pipe 59 and is opened or closed in accordance with a, command from the control unit 20.

The anode gas pipe system 70 supplies an anode gas to the second FC stack 11 and discharges an anode exhaust gas which has not been consumed in the second FC stack 11. The anode gas pipe system 70 includes an anode gas pipe 71, a switching valve 72, a regulator 73, an injector 74, an anode exhaust gas pipe 75, a gas-liquid separator 76, an anode gas circulation pipe 77, a circulation pump 78, an anode drainage pipe 79, and a drainage valve 80. The anode gas pipe 71, the switching valve 72, the regulator 73, the injector 74, the anode exhaust gas pipe 75, the gas-liquid separator 76, the anode gas circulation pipe 77, the circulation pump 78, the anode drainage pipe 79, and the drainage valve 80 have the same functions as the anode gas pipe 51, the switching valve 52, the regulator 53, the injector 54, the anode exhaust gas pipe 55, the gas-liquid separator 56, the anode gas circulation pipe 57, the circulation pump 58, the anode drainage pipe 59, and the drainage valve 60 of the anode gas pipe system 50, respectively. Accordingly, the control unit 20 controls a flow rate of hydrogen which is supplied to the second FC stack 11 by controlling a drive cycle and/or a valve opening time of the injector 74.

Figure 4:
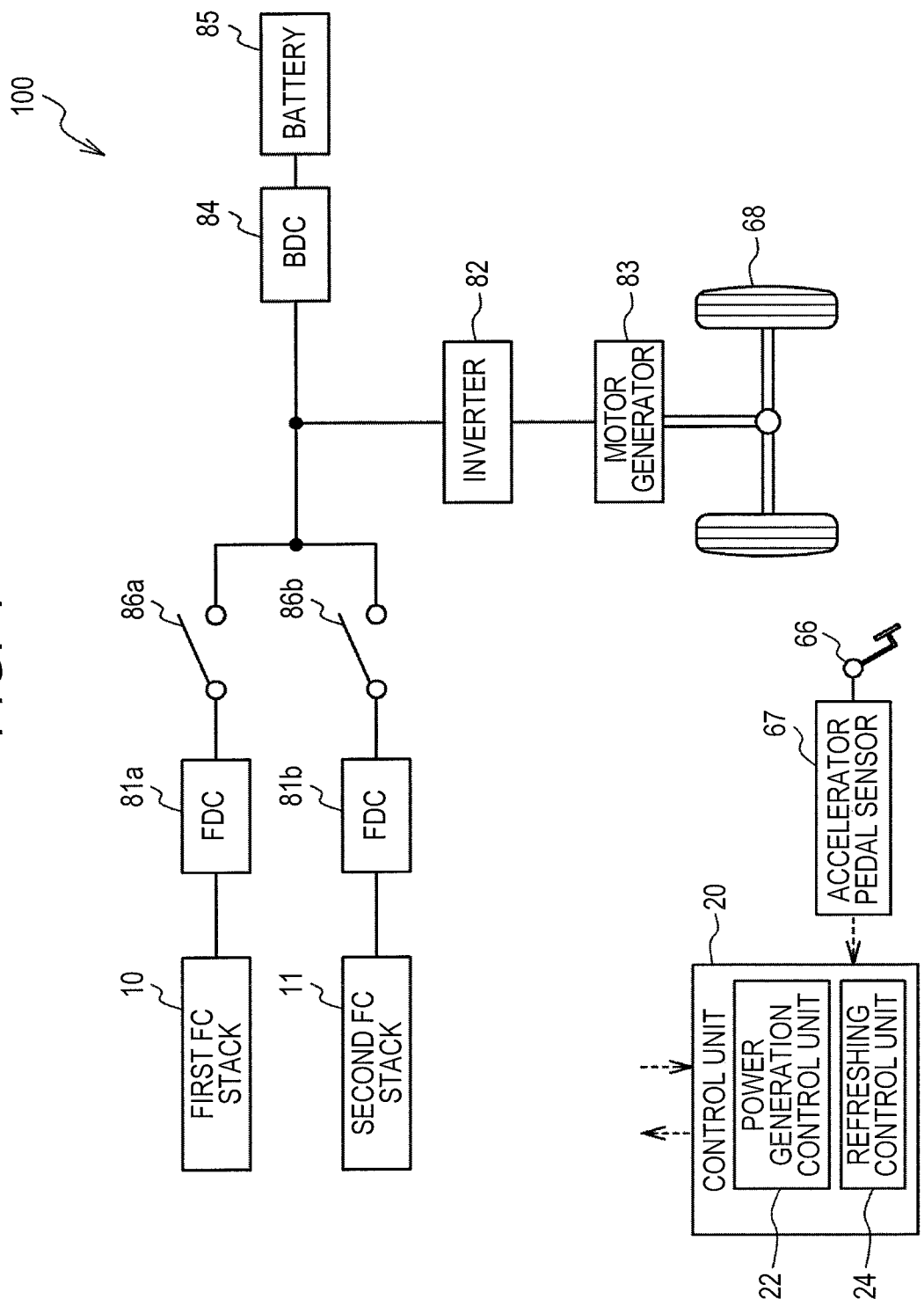
FIG. 4 is a diagram schematically illustrating an electrical configuration of the fuel cell system according to the first embodiment.

FIG. 4 is a diagram schematically illustrating an electrical configuration of the fuel cell system according to the first embodiment. The fuel cell system 100 includes FDCs 81a and 81*b*, an inverter 82, a motor generator 83, a BDC 84, a battery 85, and switches 86*a* and 86*b* in addition to the control unit 20.

The FDCs 81*a* and 81*b* are DC/DC converters. The FDC 81*a* transforms the output voltage of the first FC stack 10 and supplies the transformed output voltage to the inverter 82 and the BDC 84. The FDC 81*b* transforms the output voltage of the second FC stack 11 and supplies the transformed output voltage to the inverter 82 and the BDC 84. The BDC 84 is a DC/DC converter. The battery 85 is a secondary battery that is chargeable and dischargeable. The BDC 84 can adjust a DC voltage from the battery 85 and output the adjusted DC voltage to the inverter 82, and can adjust DC voltages from the first FC stack 10 and the second FC stack 11 and a voltage from the motor generator 83 converted into DC by the inverter 82 and output the adjusted voltages to the battery 85. The inverter 82 is a DC/AC inverter, converts DC power output from the first FC stack 10, the second FC stack 11, and the battery 85 into AC power, and supplies the AC power to the motor generator 83. The motor generator 83 drives vehicle wheels 68. The switches 86*a* and 86*b* are opened and closed in accordance with a command from the control unit 20 and switches between electrical connection and disconnection of the first FC stack 10, the second FC stack 11, the motor generator 83, and the battery 85.

The control unit 20 is an electronic control unit (ECU) which is constituted by a microcomputer including a central processing unit (CPU), a random access memory (RAM), a read only memory (ROM), and a storage unit. The storage unit is a nonvolatile memory such as a hard disk drive (HDD) or a flash memory. The control unit 20 comprehensively controls the constituent units of the fuel cell system 100 and controls operation of the fuel cell system 100.

The control unit 20 acquires an accelerator operation amount signal from the accelerator pedal sensor 67 that detects an amount of operation of the accelerator pedal 66 and calculates a required power for the first FC stack 10 and the second FC stack 11 from the acquired accelerator operation amount signal. Then, the control unit 20 controls gas supply flow rates to the first FC stack 10 and the second FC stack 11, duty ratios of the FDCs 81*a* and 81*b*, and the like based on the calculated required power and controls power generation of the first FC stack 10 and the second FC stack 11. In this way, the control unit 20 serves as the power generation control unit 22 that calculates the required power for the first FC stack 10 and the second FC stack 11 from the accelerator operation amount signal and controls power generation of the first FC stack 10 and the second FC stack 11 based on the calculated required power.

For example, the power generation control unit 22 controls a flow rate of a cathode gas which is supplied to the first FC stack 10 and the second FC stack 11 by controlling the air compressors 32 and 42 and the like and controls a flow rate of an anode gas which is supplied to the first FC stack 10 and the second FC stack 11 by controlling the injectors 54 and 74, the circulation pumps 58 and 78, and the like. The power generation control unit 22 switches the switches 86*a* and 86*b* to ON (a connected state) when the first FC stack 10 and the second FC stack 11 are allowed to generate electric power, and switches the switches 86*a* and 86*b* to OFF (a disconnected state) when power generation of the first FC stack 10 and the second FC stack 11 is stopped. In the first embodiment, a configuration in which the switches 86*a* and 86*b* are provided separately from the FDCs 81*a* and 81*b* is employed, but the disclosure is not limited thereto. For example, by providing switching elements in the FDCs 81*a* and 81*b* and causing the control unit 20 to control the switching elements of the FDCs 81*a* and 81*b*, switching between electrical connection and disconnection of the first FC stack 10, the second FC stack 11, the motor generator 83, and the battery 85 may be carried out.

As described above, the control unit 20 calculates a required power for the first FC stack 10 and the second FC stack 11 based on the accelerator operation amount signal. Then, the control unit 20 performs a refreshing process on the first FC stack 10 and the second FC stack 11 based on the calculated required power. In this way, the control unit 20 serves as the refreshing control unit 24 that calculates a required power for the first FC stack 10 and the second FC stack 11 from the accelerator operation amount signal and performs a refreshing process on the first FC stack 10 and the second FC stack 11 based on the calculated required power. For example, the refreshing control unit 24 controls a flow rate of a cathode gas which is supplied to the first FC stack 10 and the second FC stack 11 by controlling the air compressors 32 and 42 and the like. In addition, the refreshing control unit 24 performs a refreshing process of temporarily decreasing the voltages of the first FC stack 10 and the second FC stack 11 by switching the switches 86*a* and 86*b* to ON to sweep the first FC stack 10 and the second FC stack 11 with a current.

Figure 5:
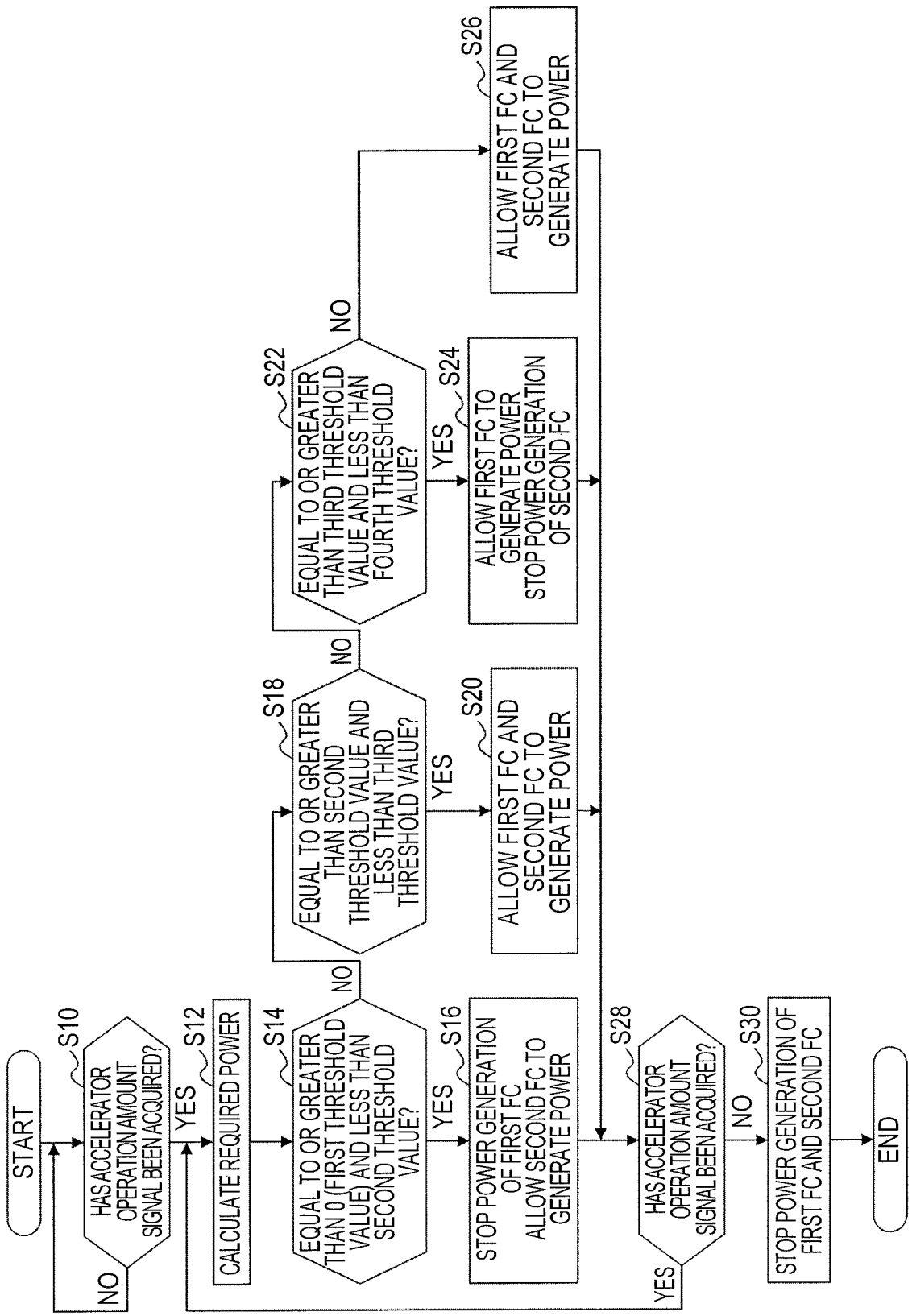
FIG. 5 is a flowchart illustrating power generation control according to the first embodiment.
Figure 6:
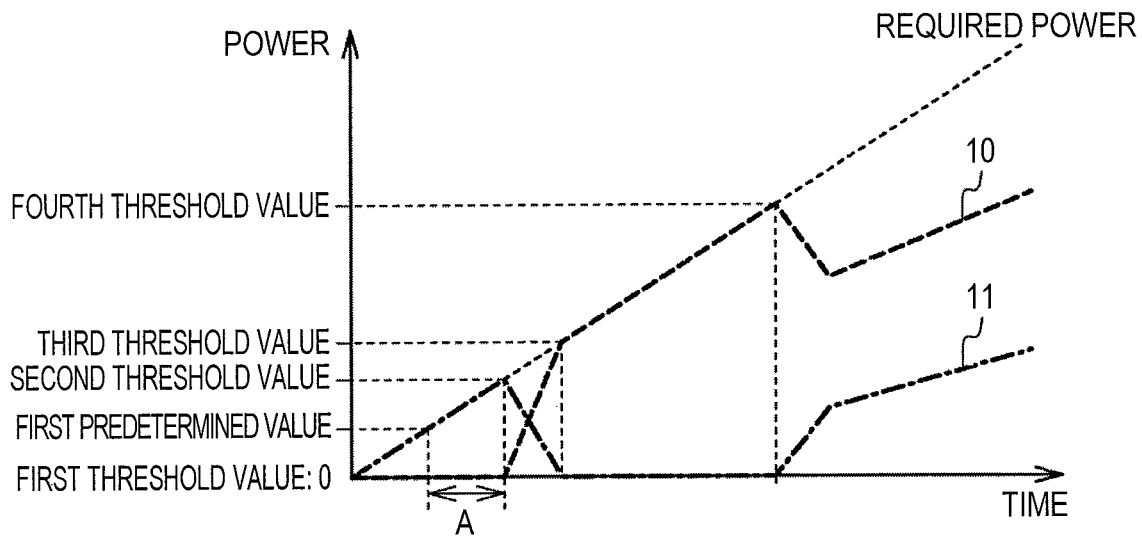
FIG. 6 is a timing chart illustrating power generation control and refreshing control according to the first embodiment.

FIG. 5 is a flowchart illustrating power generation control according to the first embodiment. FIG. 6 is a timing chart illustrating power generation control and refreshing control according to the first embodiment. As illustrated in FIG. 5, the control unit 20 waits until an accelerator operation amount signal with a nonzero operation amount output from the accelerator pedal sensor 67 is acquired (Step S10). When an accelerator operation amount signal with a nonzero operation amount is acquired (YES in Step S10), the control unit 20 calculates a required power based on the accelerator operation amount signal (Step S12). For example, the control unit 20 calculates the required power for the first FC stack 10 and the second FC stack 11 from the acquired accelerator operation amount signal with reference to a map indicating a correlation between the accelerator operation amount signal and the required power which is stored in the storage unit.

Subsequently, the control unit 20 determines whether the calculated required power is equal to or greater than 0 (a first threshold value) and less than a second threshold value greater than 0 (Step S14). For example, a value which is equal to or greater than 70% of the maximum output power of the second FC stack 11 and equal to or less than 100% thereof can be used as the second threshold value. The second threshold value may be determined from the maximum output power in an initial state of the second FC stack 11 or may be determined from the maximum output power acquired at a predetermined time after the second FC stack 11 has operated.

When it is determined in Step S14 that the required power is equal to or greater than 0 (the first threshold value) and less than the second threshold value (YES in Step S14), the control unit 20 controls the constituent units of the fuel cell system 100 such that power generation of the first FC stack 10 is stopped and the second FC stack 11 generates electric power to meet the required power using the second FC stack 11 (Step S16). At this time, the control unit 20 switches the switch 86*b* to ON such that the second FC stack 11 is electrically connected to the motor generator 83 and switches the switch 86*a* to OFF such that the first FC stack 10 is electrically disconnected from the motor generator 83. The control unit 20 drives the air compressor 42, the injector 74, and the like such that air and hydrogen necessary for power generation for meeting the required power are supplied to the second FC stack 11. The control unit 20 may stop driving of the air compressor 32, the injector 54, and the like such that air and hydrogen are not supplied to the first FC stack 10 or may drive the air compressor 32, the injector 54, and the like such that air and hydrogen are supplied to the first FC stack 10. Even when air and hydrogen are supplied to the first FC stack 10, the switch 86a that electrically connects the first FC stack 10 to the motor generator 83 are in the OFF state and thus the first FC stack 10 does not generate electric power.

By performing control of Steps S14 and S16, as illustrated in FIG. 6, the required power is met by the power generation of the second FC stack 11 in a time in which the required power for the first FC stack 10 and the second FC stack 11 is between 0 (the first threshold value) and the second threshold value.

When it is determined in Step S14 that the required power is not in the range equal to or greater than 0 (the first threshold value) and less than the second threshold value (NO in Step S14), the control unit 20 determines whether the required power is equal to or greater than the second threshold value and less than a third threshold value greater than the second threshold value (Step S18).

When it is determined in Step S18 that the required power is equal to or greater than the second threshold value and less than the third threshold value (YES in Step S18), the control unit 20 controls the constituent units of the fuel cell system 100 such that both the first FC stack 10 and the second FC stack 11 generate electric power to meet the required power (Step S20). That is, the control unit 20 drives the air compressor 32, the injector 54, and the like such that air and hydrogen are supplied to the first FC stack 10. The control unit 20 drives the air compressor 42, the injector 74, and the like such that air and hydrogen are supplied to the second FC stack 11. At this time, the control unit 20 switches the switches 86a and 86b to ON such that the first FC stack 10 and the second FC stack 11 are electrically connected to the motor generator 83. Accordingly, as illustrated in FIG. 6, the required power is met by power generation of both the first FC stack 10 and the second FC stack 11 in the time in which the required power is equal to or greater than the second threshold value and less than the third threshold value.

When it is determined in Step S18 that the required power is not in the range equal to or greater than the second threshold value and less than the third threshold value (NO in Step S18), the control unit 20 determines whether the required power is equal to or greater than the third threshold value and less than a fourth threshold value greater than the third threshold value (Step S22). For example, a value which is equal to or greater than 70% of the maximum output power of the first FC stack 10 and equal to or less than 100% thereof can be used as the fourth threshold value. The fourth threshold value may be determined from the maximum output power in the initial state of the first FC stack 10 or may be determined from the maximum output power acquired at a predetermined time after the first FC stack 10 has operated.

When it is determined in Step S22 that the required power is equal to or greater than the third threshold value and less than the fourth threshold value (YES in Step S22), the control unit 20 controls the constituent units of the fuel cell system 100 such that power generation of the second FC stack 11 is stopped and the first FC stack 10 is caused to generate electric power to meet the required power using the first FC stack 10 (Step S24). At this time, the control unit 20 switches the switch 86a to ON such that the first FC stack 10 is electrically connected to the motor generator 83 and switches the switch 86b to OFF such that the second FC stack 11 is electrically disconnected from the motor generator 83. The control unit 20 drives the air compressor 32, the injector 54, and the like such that air and hydrogen necessary for power generation for meeting the required power are supplied to the first FC stack 10. The control unit 20 may stop driving of the air compressor 42, the injector 74, and the like such that air and hydrogen are not supplied to the second FC stack 11 or may drive the air compressor 42, the injector 74, and the like such that air and hydrogen are supplied to the second FC stack 11. Even when air and hydrogen are supplied to the second FC stack 11, the switch 86b that electrically connects the second FC stack 11 to the motor generator 83 are in the OFF state and thus the second FC stack 11 does not generate electric power. Accordingly, as illustrated in FIG. 6, the required power is met by power generation of the first FC stack 10 in the time in which the required power is equal to or greater than the third threshold value and less than the fourth threshold value.

The control of causing both the first FC stack 10 and the second FC stack 11 to generate electric power when the required power is equal to or greater than the second threshold value and less than the third threshold value is performed for switching between a case in which the required power is less than the second threshold value with which the required power is met by only the second FC stack 11 and a case in which the required power is equal to or greater than the third threshold value with which the required power is met by only the first FC stack 10. When power generation of the first FC stack 10 and the second FC stack 11 are stopped by switching the switches 86a and 86b to OFF while supplying a sufficient amount of reactant gas to the first FC stack 10 and the second FC stack 11, the output power of the first FC stack 10 and the second FC stack 11 can be rapidly increased by switching the switches 86a and 86b to ON. In this case, the second threshold value and the third threshold value may be the same value.

When it is determined in Step S22 that the required power is equal to or greater than the fourth threshold value (NO in Step S22), the control unit 20 causes both the first FC stack 10 and the second FC stack 11 to generate electric power such that the required power is met (Step S26). Accordingly, as illustrated in FIG. 6, the required power is met by power generation of both the first FC stack 10 and the second FC stack 11 in the time in which the required power is equal to or greater than the fourth threshold value. At this time, the control unit 20 switches the switches 86a and 86b to ON such that the first FC stack 10 and the second FC stack 11 are electrically connected to the motor generator 83.

Subsequently, the control unit 20 determines whether an accelerator operation amount signal with a nonzero operation amount is acquired from the accelerator pedal sensor 67 (Step S28). When an accelerator operation amount signal with a nonzero operation amount is acquired (YES in Step S28), the control unit 20 returns to Step S12. On the other hand, when an accelerator operation amount signal with a nonzero operation amount has not acquired (NO in Step S28), the control unit 20 stops power generation of the first FC stack 10 and the second FC stack 11 (Step S30) and ends the power generation control.

Figure 7:
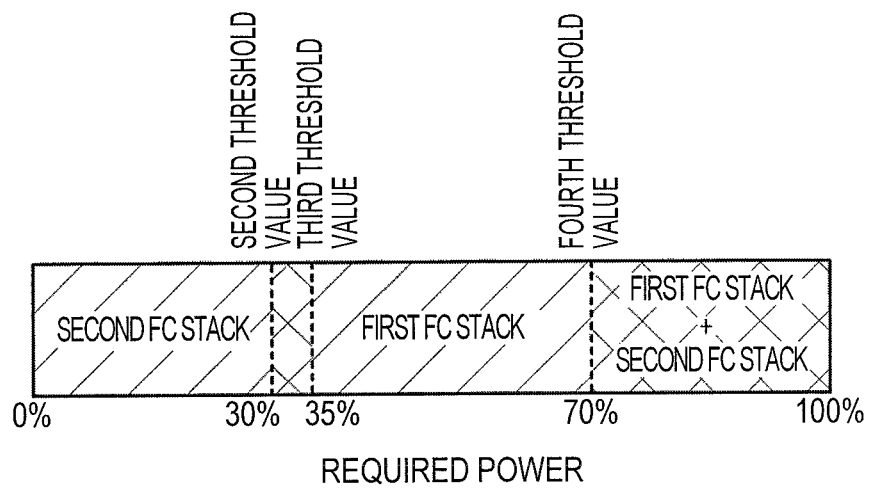
FIG. 7 is a diagram illustrating power generation control according to the first embodiment.

FIG. 7 is a diagram illustrating power generation control according to the first embodiment. In FIG. 7, when the total sum of the maximum output power of the first FC stack 10 and the maximum output power of the second FC stack 11 (hereinafter also referred to as a total maximum power) is defined as 100%, it is assumed that the maximum output power of the first FC stack 10 is 70% and the maximum output power of the second FC stack 11 is 30%. It is assumed that the second threshold value is 100% of the maximum output power of the second FC stack 11, that is, 30% of the total maximum power, and the fourth threshold value is 100% of the maximum output power of the first FC stack 10, that is, 70% of the total maximum power. It is assumed that the third threshold value is 35% of the total maximum power.

As illustrated in FIG. 7, when the required power is less than 30% of the total maximum power (less than the second threshold value), the required power is met by power generation of the second FC stack 11. When the required power is equal to or greater than 35% of the total maximum power and less than 70% of the total maximum power (equal to or greater than the third threshold value and less than the fourth threshold value), the required power is met by power generation of the first FC stack 10. When the required power is equal to or greater than 30% of the total maximum power and less than 35% of the total maximum power (equal to or greater than the second threshold value and less than the third threshold value) and when the required power is equal to or greater than 70% of the total maximum power (equal to or greater than the fourth threshold value), the required power is met by power generation of both the first FC stack 10 and the second FC stack 11.

For example, when the maximum output power of the first FC stack 10 and the maximum output power of the second FC stack 11 are the same and the required power is greater than 50% of the total maximum power, the required power is met by power generation of both the first FC stack 10 and the second FC stack 11. That is, the required power can be met by power generation of only one of the first FC stack 10 and the second FC stack 11 only when the required power is equal to or less than 50% of the total maximum power. Accordingly, in the first embodiment, since the maximum output power of the first FC stack 10 is greater than the maximum output power of the second FC stack 11, a time in which the first FC stack 10 and/or the second FC stack 11 generates electric power alone can be extended as illustrated in FIG. 7. In other words, the time in which at least one of the first FC stack 10 and the second FC stack 11 stops power generation can be extended. Accordingly, it is possible to suppress deterioration due to a potential variation at the time of power generation of the first FC stack 10 and/or the second FC stack 11 and to improve durability of the first FC stack 10 and/or the second FC stack 11.

Figure 8:
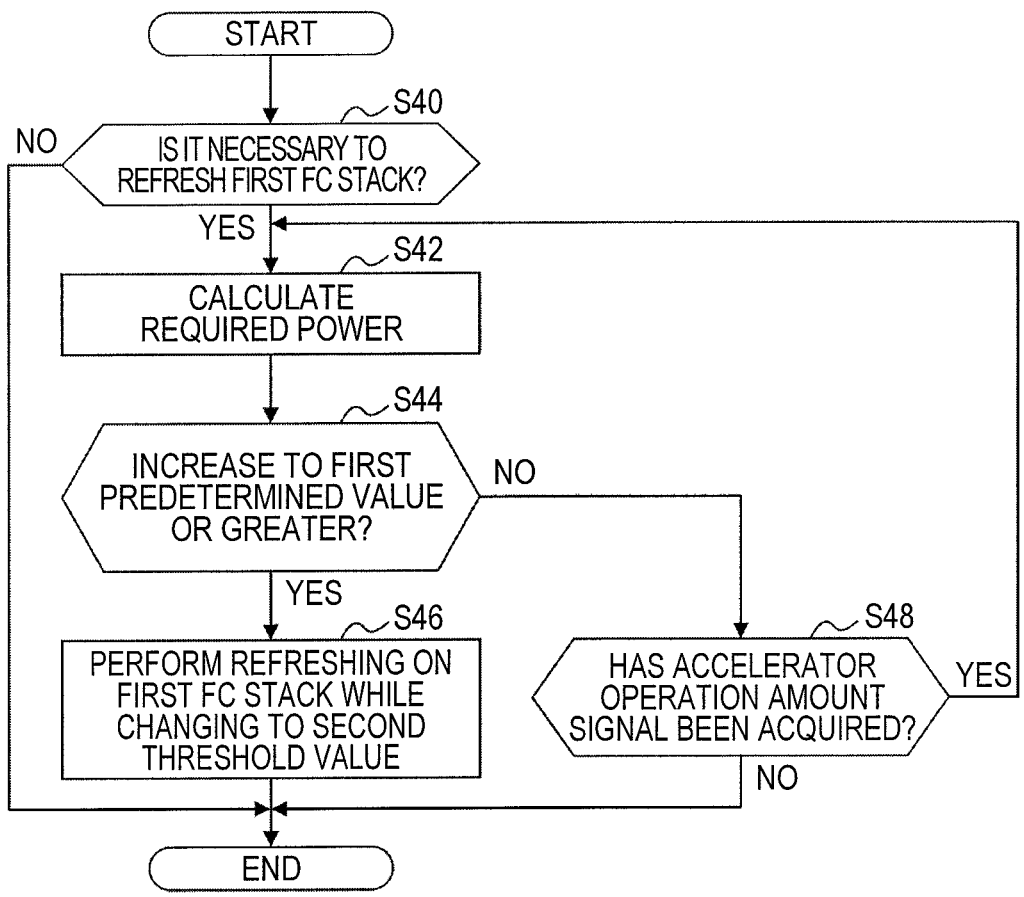
FIG. 8 is a flowchart illustrating refreshing control according to the first embodiment.

FIG. 8 is a flowchart illustrating refreshing control according to the first embodiment. Refreshing control is repeatedly performed at predetermined time intervals while the fuel cell system is operating. Here, the predetermined time intervals may be, for example, 1 second, 1 minute, or 1 hour. As illustrated in FIG. 8, the control unit 20 determines whether a refreshing process is necessary for the first FC stack 10 (Step S40). Whether a refreshing process is necessary may be determined, for example, using at least one of (1) to (4).

(1) It is determined that a refreshing process is necessary when a voltage value of the first FC stack 10 at a predetermined current density is less than a threshold value.

(2) It is determined that a refreshing process is necessary when an elapsed time from a previous refreshing process on the first FC stack 10 is equal to or greater than a predetermined time.

(3) It is determined that a refreshing process is necessary when an operation time of the first FC stack 10 from a previous refreshing process on the first FC stack 10 is equal to or greater than a predetermined time.

(4) It is determined that a refreshing process is necessary when a running distance of a vehicle in which the fuel cell system 100 is mounted from a previous refreshing process on the first FC stack 10 is equal to or greater than a predetermined distance.

When it is determined that a refreshing process is not necessary for the first FC stack 10 (NO in Step S40), the control unit 20 ends refreshing control. On the other hand, when it is determined that a refreshing process is necessary for the first FC stack 10 (YES in Step S40), the control unit 20 performs Step S42.

In Step S42, the control unit 20 calculates a required power for the first FC stack 10 and the second FC stack 11 based on an acquired accelerator operation amount signal. Subsequently, the control unit 20 determines whether the required power for the first FC stack 10 and the second FC stack 11 has increased to a first predetermined value or greater from a state in which the required power is less than the first predetermined value which is greater than 0 (the first threshold value) and less than the second threshold value (Step S44). For example, the first predetermined value can be set to a central value between 0 (the first threshold value) and the second threshold value as illustrated in FIG. 6.

When it is determined that the required power has increased from a value less than the first predetermined value to the first predetermined value or greater (YES in Step S44), the control unit 20 performs a refreshing process on the first FC stack 10 until the required power reaches the second threshold value (Step S46). That is, in FIG. 6, the refreshing process is performed on the first FC stack 10 for time A. The refreshing process can be performed, for example, by switching the switch 86a to ON to sweep the first FC stack 10 with a predetermined output current in a state in which supply of air to the first FC stack 10 is stopped or an amount of air to be supplied is decreased and temporarily decreasing the voltage of the first FC stack 10 to a target voltage. The refreshing process may be performed by switching the switch 86a to ON to allow a large current to flow in the first FC stack 10 in a state in which a sufficient amount of reactant gas is supplied to the first FC stack 10 and temporarily decreasing the voltage of the first FC stack 10 to a target voltage.

When it is determined that the required power has not increased to the first predetermined value or greater (NO in Step S44), the control unit 20 determines whether an accelerator operation amount signal with a nonzero operation amount is continuously acquired (Step S48). When an accelerator operation amount signal with a nonzero operation amount is continuously acquired (YES in Step S48), the control unit 20 returns to Step S42. On the other hand, when an accelerator operation amount signal with a nonzero operation amount is not acquired (NO in Step S48), the control unit 20 ends refreshing control.

According to the first embodiment, as illustrated in FIGS. 5 and 6, the control unit 20 stops power generation of the first FC stack 10 when the required power is equal to or greater than 0 (the first threshold value) and less than the second threshold value, and causes the first FC stack 10 to generate electric power when the required power is equal to or greater than the second threshold value. As illustrated in FIGS. 6 and 8, when the required power has increased to the first predetermined value or greater from a state in which the required power is less than the first predetermined value which is greater than the first threshold value and less than the second threshold value and the required power is in a range which is equal to or greater than the first predetermined value and less than the second threshold value, the control unit 20 performs a refreshing process on the first FC stack 10. When the required power has increased to the first predetermined value or greater, there is a high likelihood that the first FC stack 10 will start power generation. Accordingly, by performing the refreshing process on the first FC stack 10 when the required power is in the range which is equal to or greater than the first predetermined value and less than the second threshold value, there is a high likelihood that the first FC stack 10 will start power generation in a short time after an oxide layer and impurities on a catalyst surface are removed through the refreshing process. Accordingly, the first FC stack 10 is prevented from being maintained at a high potential for a long time in a state in which an oxide layer and impurities on the catalyst surface have been removed through the refreshing process. Since there is a high likelihood that the first FC stack 10 will start power generation in a short time after an oxide layer and impurities on the catalyst surface have been removed through the refreshing process, the first FC stack 10 generates electric power in a state in which formation of an oxide layer on the catalyst surface and attachment of impurities thereto are suppressed. In this way, a refreshing process can be performed on the first FC stack 10 at an appropriate time at which power generation performance is not likely to degrade. Since a refreshing process is performed on the first FC stack 10 when there is a high likelihood that the first FC stack 10 will start power generation, it is possible to prevent a refreshing process from being excessively performed and to prevent loss due to emission of heat and cooling of the first FC stack 10 at the time of the refreshing process.

As illustrated in FIG. 8, preferably, the control unit 20 determines whether a refreshing process is necessary for the first FC stack 10 and performs a refreshing process on the first FC stack 10 when it is determined that a refreshing process is necessary. Accordingly, since a refreshing process is not performed when a refreshing process is not necessary, it is possible to suppress power consumption and fuel consumption for performing a refreshing process.

Preferably, the control unit 20 switches the switch 86a to OFF when power generation of the first FC stack 10 is to be stopped, and switches the switch 86a from OFF to ON when a refreshing process is to be performed on the first FC stack 10. Accordingly, it is possible to perform a refreshing process on the first FC stack 10 while improving durability of the first FC stack 10 by more reliably stopping power generation of the first FC stack 10.

The refreshing process on the first FC stack 10 is preferably performed by sweeping the first FC stack 10 with a current without supplying air thereto. Accordingly, since the output power of the first FC stack 10 at the time of the refreshing process can be kept low, it is possible to suppress an influence of the output power of the first FC stack 10 on the required power.

In the first embodiment, the first predetermined value is set to the central value between the first threshold value and the second threshold value, but may be set to a value less than the central value or a value greater than the central value as long as it is a value greater than the first threshold value and less than the second threshold value. For example, the first predetermined value may be set to a larger power value out of power values at two lines which divide values between the first threshold value and the second threshold value into three parts, may be set to a largest power value out of power values at three lines which divide values between the first threshold value and the second threshold value into four parts, or may be set to a largest power value out of power values at four lines which divide values between the first threshold value and the second threshold value into five parts. Since a refreshing process can be preferably performed on the first FC stack 10 when start of power generation of the first FC stack 10 comes close, the first predetermined value is preferably set to be close to the second threshold value.

In the first embodiment, a refreshing process is performed on the first FC stack 10, but a refreshing process is performed on the second FC stack 11 in addition to the first FC stack 10 in a second embodiment. The configuration of a fuel cell system according to the second embodiment is the same as illustrated in FIG. 1 in the first embodiment, the electrical configuration thereof is the same as illustrated in FIG. 4 in the first embodiment, and thus description thereof will not be repeated. Power generation control in the second embodiment is the same as illustrated in FIG. 5 in the first embodiment, refreshing control for the first FC stack 10 is the same as illustrated in FIG. 8 in the first embodiment, and thus description thereof will not be repeated.

Figure 9:
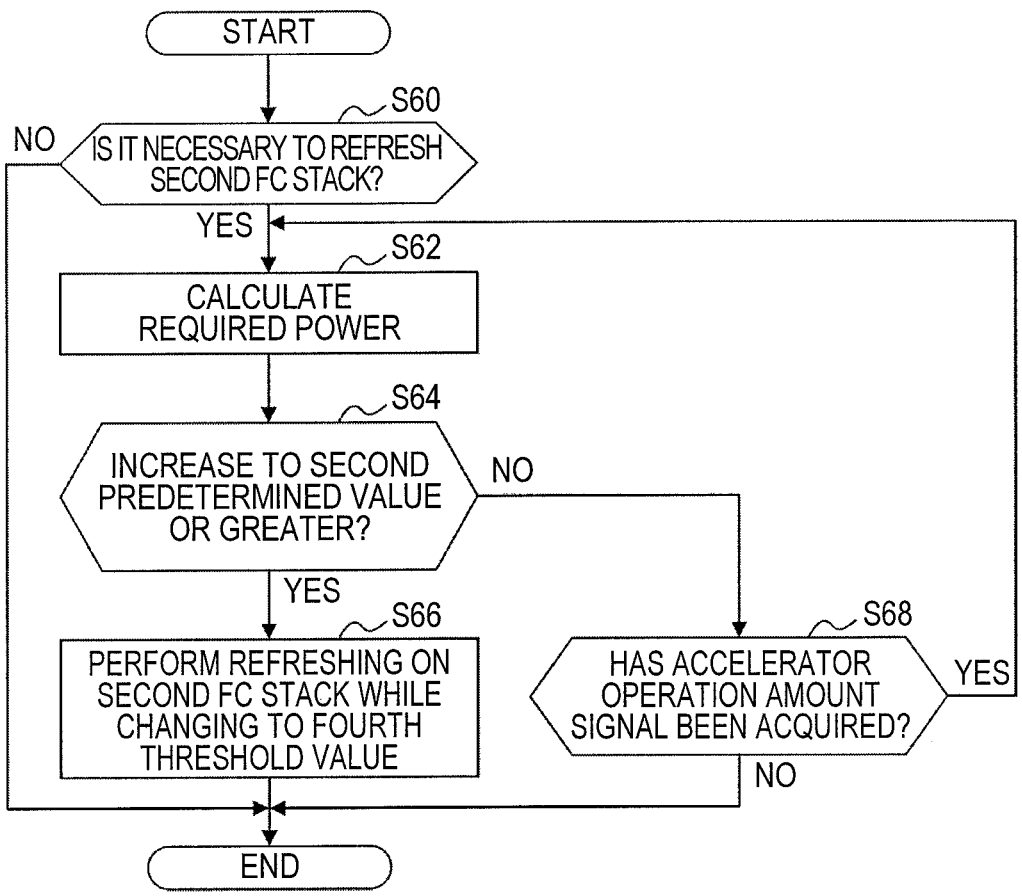
FIG. 9 is a flowchart illustrating refreshing control according to a second embodiment.
Figure 10:
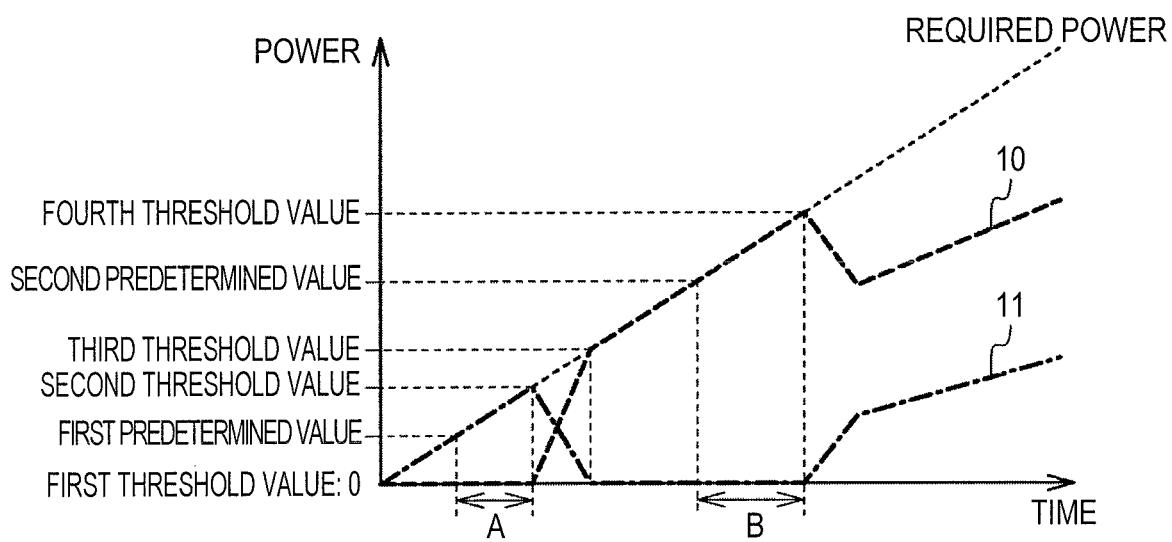
FIG. 10 is a timing chart illustrating power generation control and refreshing control according to the second embodiment.

FIG. 9 is a flowchart illustrating refreshing control according to a second embodiment. FIG. 10 is a timing chart illustrating power generation control and refreshing control according to the second embodiment. As illustrated in FIG. 9, the control unit 20 determines whether a refreshing process is necessary for the second FC stack 11 (Step S60). Whether a refreshing process is necessary for the second FC stack 11 can be determined in the same way as determining whether a refreshing process is necessary for the first FC stack 10 in Step S40 of FIG. 8.

When it is determined that a refreshing process is not necessary for the second FC stack 11 (NO in Step S60), the control unit 20 ends refreshing control. On the other hand, when it is determined that a refreshing process is necessary for the second FC stack 11 (YES in Step S60), the control unit 20 performs Step S62.

In Step S62, the control unit 20 calculates a required power for the first FC stack 10 and the second FC stack 11 based on an acquired accelerator operation amount signal. The control unit 20 determines whether the required power for the first FC stack 10 and the second FC stack 11 has increased to a second predetermined value or greater from a state in which the required power is less than the second predetermined value which is greater than the third threshold value and less than the fourth threshold value (Step S64). For example, the second predetermined value can be set to a central value between the third threshold value and the fourth threshold value as illustrated in FIG. 10.

When it is determined that the required power has increased from a value less than the second predetermined value to the second predetermined value or greater (YES in Step S64), the control unit 20 performs a refreshing process on the second FC stack 11 until the required power reaches the fourth threshold value (Step S66). That is, in FIG. 10, the refreshing process is performed on the second FC stack 11 for time B. Similarly to the refreshing process on the first FC stack 10, the refreshing process on the second FC stack 11 can be performed, for example, by switching the switch 86b to ON to sweep the second FC stack 11 with a predetermined output current in a state in which supply of air to the second FC stack 11 is stopped or an amount of air is decreased and temporarily decreasing the voltage of the second FC stack 11 to a target voltage. The refreshing process on the second FC stack 11 may be performed by switching the switch 86b to ON to allow a large current to flow in the second FC stack 11 in a state in which a sufficient amount of reactant gas is supplied to the second FC stack 11 and temporarily decreasing the voltage of the second FC stack 11 to a target voltage.

When it is determined that the required power has not increased from a value less than the second predetermined value to the second predetermined value or greater (NO in Step S64), the control unit 20 determines whether an accelerator operation amount signal with a nonzero operation amount is continuously acquired (Step S68). When an accelerator operation amount signal with a nonzero operation amount is continuously acquired (YES in Step S68), the control unit 20 returns to Step S62. On the other hand, when an accelerator operation amount signal with a nonzero operation amount is not acquired (NO in Step S68), the control unit 20 ends refreshing control.

According to the second embodiment, as illustrated in FIG. 10, the control unit 20 stops power generation of the second FC stack 11 when the required power is equal to or greater than the third threshold value and less than the fourth threshold value, and causes the second FC stack 11 to generate electric power when the required power is equal to or greater than the fourth threshold value and when the required power is less than the third threshold value. As illustrated in FIGS. 9 and 10, when the required power has increased to the second predetermined value or greater from a state in which the required power is less than the second predetermined value which is greater than the third threshold value and less than the fourth threshold value and the required power is in a range which is equal to or greater than the second predetermined value and less than the fourth threshold value, the control unit 20 performs a refreshing process on the second FC stack 11. Accordingly, since a refreshing process is performed on the second FC stack 11 when there is a high likelihood that the second FC stack 11 will start power generation, it is possible to perform a refreshing process on the second FC stack 11 at an appropriate time at which power generation performance is not likely to degrade.

In the second embodiment, the second predetermined value is set to the central value between the third threshold value and the fourth threshold value, but may be set to a value less than the central value or a value greater than the central value as long as it is a value greater than the third threshold value and less than the fourth threshold value. For example, the second predetermined value may be set to a larger power value out of power values at two lines which divide values between the third threshold value and the fourth threshold value into three parts, may be set to a largest power value out of power values at three lines which divide values between the third threshold value and the fourth threshold value into four parts, or may be set to a largest power value out of power values at four lines which divide values between the third threshold value and the fourth threshold value into five parts. Since a refreshing process can be preferably performed on the second FC stack 11 when start of power generation of the second FC stack 11 comes close, the second predetermined value is preferably set to be close to the fourth threshold value.

Figure 11:
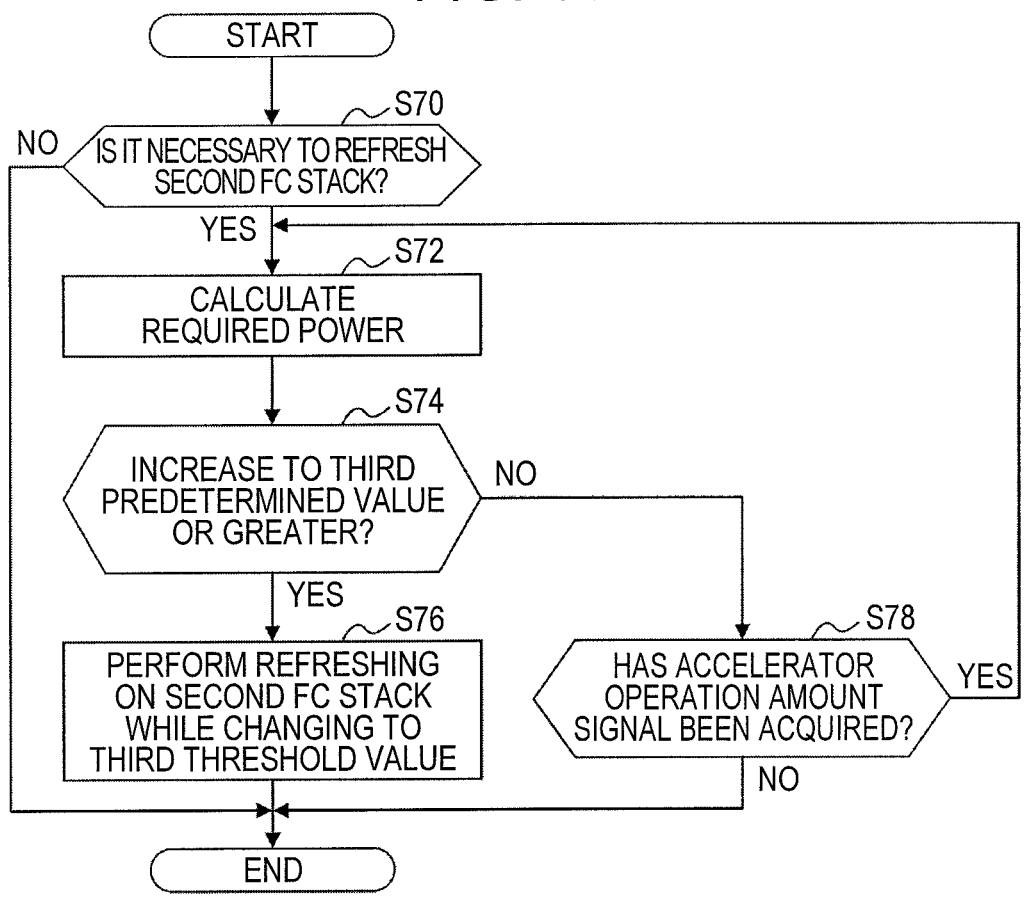
FIG. 11 is a flowchart illustrating refreshing control according to Modified Example 1 of the second embodiment.
Figure 12:
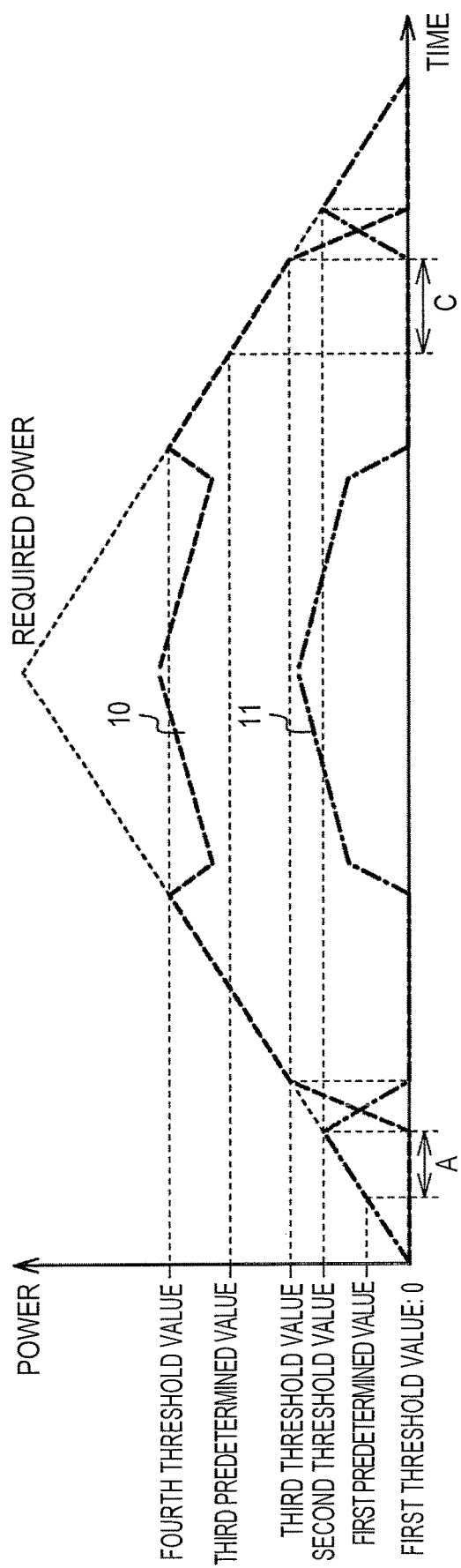
FIG. 12 is a timing chart illustrating power generation control and refreshing control according to Modified Example 1 of the second embodiment.

FIG. 11 is a flowchart illustrating refreshing control according to Modified Example 1 of the second embodiment. FIG. 12 is a timing chart illustrating power generation control and refreshing control according to Modified Example 1 of the second embodiment. As illustrated in FIG. 11, the control unit 20 determines whether a refreshing process is necessary for the second FC stack 11 (Step S70). Whether a refreshing process is necessary for the second FC stack 11 can be determined in the same way as determining whether a refreshing process is necessary for the first FC stack 10 in Step S40 of FIG. 8.

When it is determined that a refreshing process is not necessary for the second FC stack 11 (NO in Step S70), the control unit 20 ends refreshing control. On the other hand, when it is determined that a refreshing process is necessary for the second FC stack 11 (YES in Step S70), the control unit 20 performs Step S72. In Step S72, the control unit 20 calculates a required power for the first FC stack 10 and the second FC stack 11 based on an acquired accelerator operation amount signal. The control unit 20 determines whether the required power has decreased to a third predetermined value or less from a state in which the required power is greater than the third predetermined value which is greater than the third threshold value and less than the fourth threshold value (Step S74). For example, the third predetermined value can be set to a central value between the third threshold value and the fourth threshold value as illustrated in FIG. 12.

When it is determined that the required power has decreased from a value greater than the third predetermined value to the third predetermined value or less (YES in Step S74), the control unit 20 performs a refreshing process on the second FC stack 11 until the required power reaches the third threshold value (Step S76). That is, in FIG. 12, the refreshing process is performed on the second FC stack 11 for time C.

On the other hand, when it is determined that the required power has not decreased from a value greater than the third predetermined value to the third predetermined value or less (NO in Step S74), the control unit 20 determines whether an accelerator operation amount signal with a nonzero operation amount is continuously acquired (Step S78). When an accelerator operation amount signal with a nonzero operation amount is continuously acquired (YES in Step S78), the control unit 20 returns to Step S72. On the other hand, when an accelerator operation amount signal with a nonzero operation amount is not acquired (NO in Step S78), the control unit 20 ends refreshing control.

According to Modified Example 1 of the second embodiment, as illustrated in FIG. 12, the control unit 20 stops power generation of the second FC stack 11 when the required power is equal to or greater than the third threshold value and less than the fourth threshold value, and causes the second FC stack 11 to generate electric power when the required power is equal to or greater than the fourth threshold value and when the required power is less than the third threshold value. As illustrated in FIGS. 11 and 12, when the required power has decreased to the third predetermined value or less from a state in which the required power is greater than the third predetermined value which is greater than the third threshold value and less than the fourth threshold value and the required power is in a range which is equal to or greater than the third threshold value and equal to or less than the third predetermined value, the control unit 20 performs a refreshing process on the second FC stack 11. Accordingly, since a refreshing process is performed on the second FC stack 11 when there is a high likelihood that the second FC stack 11 will start power generation, it is possible to perform a refreshing process on the second FC stack 11 at an appropriate time at which power generation performance is not likely to degrade. In Modified Example 1 of the second embodiment, unlike the second embodiment, even when the required power does not increase to the fourth threshold value or greater, it is possible to perform a refreshing process on the second FC stack 11 at an appropriate time.

In Modified Example 1 of the second embodiment, the third predetermined value is set to the central value between the third threshold value and the fourth threshold value, but may be set to a value less than the central value or a value greater than the central value as long as it is a value greater than the third threshold value and less than the fourth threshold value. For example, the third predetermined value may be set to a smaller power value out of power values at two lines which divide values between the third threshold value and the fourth threshold value into three parts, may be set to a smallest power value out of power values at three lines which divide values between the third threshold value and the fourth threshold value into four parts, or may be set to a smallest power value out of power values at four lines which divide values between the third threshold value and the fourth threshold value into five parts. Since a refreshing process can be preferably performed on the second FC stack 11 when start of power generation of the second FC stack 11 comes close, the third predetermined value is preferably set to be close to the third threshold value.

The refreshing control according to the second embodiment and the refreshing control according to Modified Example 1 of the second embodiment may be combined. That is, the refreshing process may be performed on the second FC stack 11 in both time B illustrated in FIG. 10 and time C illustrated in FIG. 12.

In the first embodiment, the second embodiment, and Modified Example 1 of the second embodiment, the maximum output power of the first FC stack 10 is greater than the maximum output power of the second FC stack 11, but the maximum output power of the first FC stack 10 and the maximum output power of the second FC stack 11 may be the same. In this case, it is possible to perform the same power generation control and refreshing control by appropriately setting the threshold values which are used to switch power generation between the first FC stack 10 and the second FC stack 11.

In the first embodiment, the second embodiment, and Modified Example 1 of the second embodiment, two FC stacks (the first FC stack 10 and the second FC stack 11) are provided as a plurality of FC stacks, but three or more FC stacks may be provided. Even when three or more FC stacks are provided, it is also possible to perform the same power generation control and refreshing control.

That is, when the required power is equal to or greater than 0 (the first threshold value) and less than the second threshold value, power generation of a first FC stack out of the plurality of FC stacks is stopped and the required power is met by the FC stacks other than the first FC stack. When the required power is equal to or greater than the second threshold value and less than the third threshold value, the required power is met by power generation of a plurality of FC stacks including a first FC stack and a second FC stack out of the plurality of FC stacks. When the required power is equal to or greater than the third threshold value and less than the fourth threshold value, power generation of a second FC stack out of the plurality of FC stacks is stopped and the required power is met by the FC stacks other than the second FC stack. When the required power is equal to or greater than the fourth threshold value, the required power is met by a plurality of FC stacks including the second FC stack out of the plurality of FC stacks.

Switching between power generation of a plurality of FC stacks and stop of the power generation is not limited to the case described in the first embodiment, but may be applied to a case as long as switching between power generation and stop of power generation of an FC stack is performed based on a required power. The first threshold value is set to 0, but the disclosure is not limited thereto and the first threshold value may be set to a value which is greater than 0 and less than the second threshold value. Control for stopping power generation of the first FC stack 10 when the required power is equal to or greater than the first threshold value and less than the second threshold value and causing the first FC stack 10 to perform power generation when the required power is equal to or greater than the second threshold value has only to be included.

Depending on a method of controlling power generation and stop of power generation of the first FC stack 10 and the second FC stack 11, power generation of the first FC stack 10 may be stopped even when the required power is not in a range which is equal to or greater than the first threshold value and less than the second threshold value. For example, the first FC stack 10 may stop power generation when the required power is equal to or greater than an X-th threshold value greater than the second threshold value and less than a Y-th threshold value greater than the X-th threshold value and may perform power generation when the required power is equal to or greater than the Y-th threshold value. In this case, a refreshing process may be performed on the first FC stack 10 until the required power reaches the Y-th threshold value after the required power has increased to be equal to or greater than a power value at a bisector which divides values between the X-th threshold value and the Y-th threshold value into two parts.

While embodiments of the disclosure have been described above, the disclosure is not limited to any specific embodiment and can be modified and changed in various forms without departing from the gist of the disclosure.

What is claimed is:

1. A fuel cell system comprising:
   a plurality of fuel cell stacks including a first fuel cell stack and a second fuel cell stack;
   a power generation control unit configured to control power generation of the plurality of fuel cell stacks based on a required power for the plurality of fuel cell stacks;
   a refreshing control unit configured to perform a refreshing process of decreasing a voltage on the plurality of fuel cell stacks; and
   a plurality of switches that are connected between the plurality of fuel cell stacks and an auxiliary machine into which a current supplied from the plurality of fuel cell stacks flows,
   wherein the power generation control unit is configured to:
      stop power generation of the first fuel cell stack when the required power is equal to or greater than a first threshold value and less than a second threshold value which is greater than the first threshold value,
      set a switch that is connected between the first fuel cell stack and the auxiliary machine out of the plurality of switches to a disconnected state when the power generation of the first fuel cell stack is stopped, and
      allow the first fuel cell stack to generate electric power when the required power is equal to or greater than the second threshold value, and
   wherein the refreshing control unit is configured to:
      perform the refreshing process on the first fuel cell stack when the required power changes from a state in which the required power is less than a first predetermined value which is greater than the first threshold value and less than the second threshold value to a state in which the required power is equal to or greater than the first predetermined value and when the required power is in a range which is equal to or greater than the first predetermined value and less than the second threshold value, and change a state of the switch that is connected between the first fuel cell stack and the auxiliary machine from the disconnected state to a connected state when the refreshing process is to be performed on the first fuel cell stack.

2. The fuel cell system according to claim 1, wherein the refreshing control unit is configured to determine whether the refreshing process is to be performed on the first fuel cell stack and to perform the refreshing process on the first fuel cell stack when it is determined that the refreshing process is to be performed.

3. The fuel cell system according to claim 2, wherein the refreshing control unit determines that the refreshing process is to be performed on the first fuel cell stack when at least one of following conditions (1) to (4) is met:

(1) a voltage value of the first fuel cell stack at a predetermined current density is less than a threshold value, (2) an elapsed time from a previous refreshing process on the first fuel cell stack is equal to or greater than a first predetermined time, (3) an operation time of the first fuel cell stack from the previous refreshing process on the first fuel cell stack is equal to or greater than a second predetermined time, and (4) a running distance of a vehicle in which the fuel cell system is mounted from the previous refreshing process on the first fuel cell stack is equal to or greater than a predetermined distance.

4. The fuel cell system according to claim 1, wherein the refreshing control unit is configured to perform the refreshing process by sweeping the first fuel cell stack with a current without supplying a cathode gas thereto.

5. The fuel cell system according to claim 1, wherein the first predetermined value is a central value between the first threshold value and the second threshold value.

6. The fuel cell system according to claim 1, wherein the first threshold value is 0.

7. A fuel cell system comprising:

a plurality of fuel cell stacks including a first fuel cell stack and a second fuel cell stack;

a power generation control unit configured to control power generation of the plurality of fuel cell stacks based on a required power for the plurality of fuel cell stacks; and a refreshing control unit configured to perform a refreshing process of decreasing a voltage on the plurality of fuel cell stacks, wherein the power generation control unit is configured to:

stop power generation of the first fuel cell stack when the required power is equal to or greater than a first threshold value and less than a second threshold value which is greater than the first threshold value and to allow the first fuel cell stack to generate electric power when the required power is equal to or greater than the second threshold value, and stop power generation of the second fuel cell stack when the required power is equal to or greater than a third threshold value which is equal to or greater than the second threshold value and is less than a fourth threshold value which is greater than the third threshold value and to allow the second fuel cell stack to generate the electric power when the required power is equal to or greater than the fourth threshold value and when the required power is less than the third threshold value, wherein the refreshing control unit is configured to perform the refreshing process on the first fuel cell stack when the required power changes from a state in which the required power is less than a first predetermined value which is greater than the first threshold value and less than the second threshold value to a state in which the required power is equal to or greater than the first predetermined value and when the required power is in a range which is equal to or greater than the first predetermined value and less than the second threshold value, and wherein the refreshing control unit is configured to perform the refreshing process on the second fuel cell stack when the required power changes from a state in which the required power is less than a second predetermined value which is greater than the third threshold value and less than the fourth threshold value to a state in which the required power is equal to or greater than the second predetermined value and when the required power is in a range which is equal to or greater than the second predetermined value and less than the fourth threshold value.

8. A fuel cell system comprising:

a plurality of fuel cell stacks including a first fuel cell stack and a second fuel cell stack;

a power generation control unit configured to control power generation of the plurality of fuel cell stacks based on a required power for the plurality of fuel cell stacks; and a refreshing control unit configured to perform a refreshing process of decreasing a voltage on the plurality of fuel cell stacks, wherein the power generation control unit is configured to stop power generation of the first fuel cell stack when the required power is equal to or greater than a first threshold value and less than a second threshold value which is greater than the first threshold value and to allow the first fuel cell stack to generate electric power when the required power is equal to or greater than the second threshold value, wherein the power generation control unit is configured to stop power generation of the second fuel cell stack when the required power is equal to or greater than a third threshold value which is equal to or greater than the second threshold value and is less than a fourth threshold value which is greater than the third threshold value and to allow the second fuel cell stack to generate the electric power when the required power is equal to or greater than the fourth threshold value and when the required power is less than the third threshold value, wherein the refreshing control unit is configured to perform the refreshing process on the first fuel cell stack when the required power changes from a state in which the required power is less than a first predetermined value which is greater than the first threshold value and less than the second threshold value to a state in which the required power is equal to or greater than the first predetermined value and when the required power is in a range which is equal to or greater than the first predetermined value and less than the second threshold value, and wherein the refreshing control unit is configured to perform the refreshing process on the second fuel cell stack when the required power changes from a state in which the required power is greater than a third predetermined value which is greater than the third threshold value and less than the fourth threshold value to a state in which the required power is equal to or less than the third predetermined value and when the required power is in a range which is equal to or greater than the third threshold value and equal to or less than the third predetermined value.

9. The fuel cell system according to claim 7, wherein a maximum output power of the first fuel cell stack is greater than that of the second fuel cell stack.

\* \* \* \* \*